(12) United States Patent
Gundel et al.

(10) Patent No.: US 11,556,892 B2
(45) Date of Patent: Jan. 17, 2023

(54) ASSET MANAGEMENT SYSTEM AND METHOD

(71) Applicant: 3M INNOVATIVE PROPERTIES COMPANY, St. Paul, MN (US)

(72) Inventors: Douglas B. Gundel, Cedar Park, TX (US); Corey D. Renfro, Round Rock, TX (US); Rama Raju B. Dutta, Austin, TX (US); Bhargavi Devalla, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/449,363

(22) Filed: Sep. 29, 2021

(65) Prior Publication Data
US 2022/0019964 A1    Jan. 20, 2022

Related U.S. Application Data

(63) Continuation of application No. 16/648,694, filed as application No. PCT/US2018/054547 on Oct. 5, 2018, now abandoned.

(60) Provisional application No. 62/569,899, filed on Oct. 9, 2017.

(51) Int. Cl.
| | | |
|---|---|---|
| G06Q 10/08 | (2012.01) | |
| H04W 4/35 | (2018.01) | |
| G06K 19/077 | (2006.01) | |

(52) U.S. Cl.
CPC ..... G06Q 10/087 (2013.01); G06K 19/07758 (2013.01); H04W 4/35 (2018.02)

(58) Field of Classification Search
CPC .. G06Q 10/087; H04W 4/35; G06K 19/07758

USPC .......................................................... 235/385
See application file for complete search history.

(56) References Cited

U.S. PATENT DOCUMENTS

| | | |
|---|---|---|
| 2003/0101108 A1 | 5/2003 | Botham |
| 2003/0151511 A1 | 8/2003 | Duncan |
| 2004/0024658 A1 | 2/2004 | Carbone |
| 2007/0156492 A1 | 7/2007 | Hawkins |
| 2009/0327102 A1 | 12/2009 | Maniar |
| 2011/0309931 A1 | 12/2011 | Rose |
| 2014/0125457 A1 | 5/2014 | Rushing |
| 2014/0129307 A1 | 5/2014 | Walker et al. |
| 2016/0350564 A1 | 12/2016 | Nedelcu |

(Continued)

FOREIGN PATENT DOCUMENTS

CN    103064123 A    4/2013

OTHER PUBLICATIONS

International Search report for PCT Int'l Appl. No. PCT/US2018/054547 dated Feb. 1, 2019, 3 pages.

*Primary Examiner* — Allyson N Trail
(74) *Attorney, Agent, or Firm* — Gregg Rosenblatt; 3M Innovative Properties Compa

(57) ABSTRACT

A method for tracking and storing unique asset information with respect to at least one asset comprises providing at least one asset having an associated tag, capturing the tag and associated asset properties to a device, wherein the associated asset properties include the global position of the device at the time of capturing the tag with the device, storing the tag and asset properties as asset information to a database wherein the asset information is associated with the tag and global position of the device, and displaying asset information associated with at least the stored tag.

11 Claims, 3 Drawing Sheets

(56) References Cited

U.S. PATENT DOCUMENTS

2018/0165714 A1 6/2018 Bleckmann

ASSET MANAGEMENT SYSTEM AND METHOD

CROSS REFERENCE TO RELATED APPLICATIONS

This application is a continuation of U.S. patent application Ser. No. 16/648,694, filed Mar. 19, 2020, now pending; which is a US 371 application of International Application No. PCT/US2018/054547, filed Oct. 5, 2018; which claims the benefit of U.S. Provisional Application Ser. No. 62/569,899, filed Oct. 9, 2017, the disclosures of which are incorporated by reference in their entirety herein.

BACKGROUND

Field of the Invention

The present invention is directed to a system and method for the management, including logging and tracking, of infrastructure assets, such as cable accessories.

Related Art

Utility owners are tasked with managing assets over complex infrastructure networks, such as electrical networks, telecommunication networks, water networks, and gas networks. For many years, the tracking of assets within those networks (e.g., electrical equipment, cable accessories, lines, cables, pipes, etc.) has been performed utilizing handwritten logs that are often subject to errors and inaccuracies.

SUMMARY

According to one embodiment of the present invention, a method for tracking and storing unique asset information with respect to at least one asset comprises providing at least one asset having an associated tag, capturing the tag and associated asset properties to a device, wherein the associated asset properties include the global position of the device at the time of capturing the tag with the device, storing the tag and asset properties as asset information to a database wherein the asset information is associated with the tag and global position of the device, and displaying asset information associated with at least the stored tag.

According to another embodiment of the invention, a system for tracking and storing unique asset information with respect to at least one asset comprises a device having an installed application that prompts a user to capture a tag associated with the at least one asset with the device, wherein the application can further capture associated asset properties to the device. The associated asset properties include the global position of the device at the time of capturing the tag with the device. The system further includes a data storage platform for storing the tag and asset properties as asset information, wherein the asset information is associated with the tag and global position of the device, and wherein the device is configured to display asset information associated with at least the stored tag.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
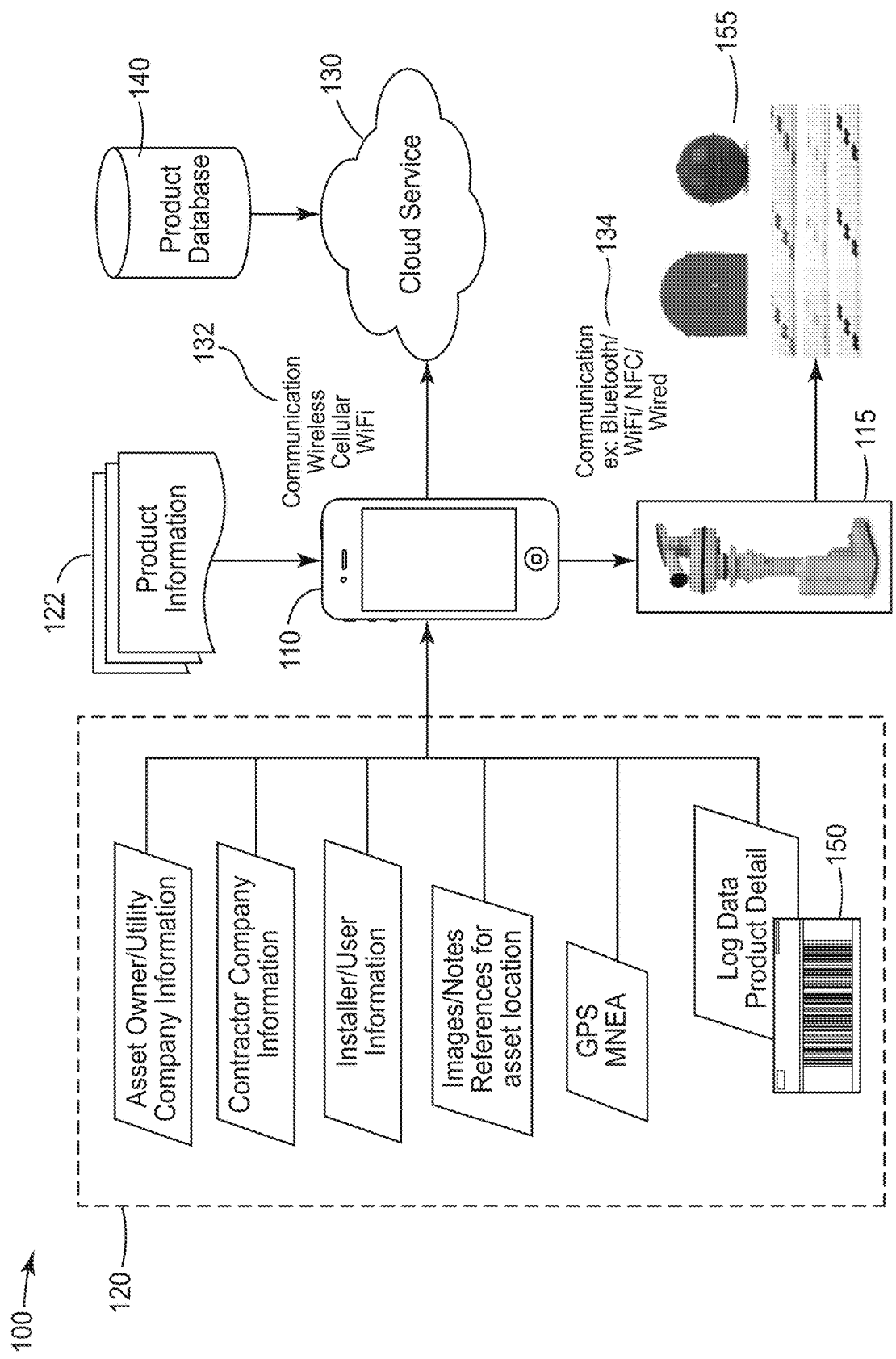
FIG. 1 is a schematic view of an asset management system according to a first embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a system and method for the management, including, but not limited to logging and tracking, of infrastructure assets, such as cable accessories. In more detail. a cloud based mobile solution can be provided for convenient logging and asset tracking of RFID, EMS, path marker and cable accessory products. In one embodiment, the system can capture tags associated with the asset, such as a barcode (e.g., UPC barcode), to provide fast and accurate asset logging. In addition, the tag information associated with the asset (or asset information) can be linked to application aids (e.g., installation videos) that can be used by the installer/contractor for asset installations. Further embodiments of the invention can provide wired or wireless connection to a locating device for firmware upgrades, capturing asset location and detecting buried RFID tags in product markers.

In a first embodiment of the present invention, a method of managing infrastructure assets is provided. FIG. 1 shows some of the aspects of this method and is provided as an illustration.

In further detail, the method for tracking and storing unique asset information with respect to at least one asset comprises providing at least one asset having an associated tag. The asset can be any infrastructure component, such as a cable, splice, accessory, conduit, etc. The asset may be physical or non-physical (e.g., voltage rating or class) in nature. The term "tag" is not meant to be limiting—a tag can be any readable/scannable/capturable asset identifier, such as a barcode (e.g., conventional UPC barcode) or RFID tag, where Radio Frequency Identification Device tags (RFID tags) are low-cost "smart" chips or "tags" that can be embedded in or attached to articles, products, and the like, to convey information about the product via information retrieved by a device or scanner.

The method of this embodiment further includes capturing the tag and associated asset properties to a device, wherein the associated asset properties include the global position of the device at the time of capturing the tag with the device. In this aspect, the device can be any type of data recording device, such as a mobile phone or scanner. In one aspect, the mobile phone or scanner includes an application (app) or embedded software that allows a user to take a photo or otherwise scan a tag. The tag can be located on the product, on the product packaging, or embedded in the product/asset. The tag identifies the asset and the application retrieves information on the asset based on the image/scan taken. The global position information of the tag/asset can be provided as GPS coordinates.

The method of this embodiment further includes storing the tag and asset properties as asset information to a database, wherein the asset information is associated with the tag and global position of the device. In this manner, a utility owner can have access to the installation location and date/time of installation when the information is sent to the database. The database can be any data storage product, device, or facility. In one embodiment, the database is provided as a cloud service platform. In an alternative embodiment, the data storage can be provided on the device itself. Information about the asset can be retrieved from this data storage location and communicated to the user via a display. As a result, an embodiment of the present invention provides a cloud-based mobile solution for the co convenient logging and asset tracking of RFID, EMS, Path Marker and cable accessory products. This solution can solve problems associated with the lengthy and error prone practice of manually logging asset information by providing a straightforward connection to the data storage location. In addition, this solution provides for upgrades and RFID programming.

For example, as shown in system 100 in FIG. 1, a device 110, such as a conventional mobile phone or tablet, can have an application installed. The device 110 can include at least one processor, memory, a communications device, and a graphical user interface. The application will provide for user inputs for asset information 120, such as the identity of the contractor/installer, the utility owner or other company information, images, notes, or references about the installation location and asset (e.g., such as temperature, weather or site conditions during the asset installation), and the GPS/NMEA location coordinates. The application allows the device 110 to record or capture an image or scan a tag, such as barcode 150. This tag/barcode 150 is linked to basic product information 122. The asset information can be stored on the device and/or communicated to data storage location, such as a cloud service 130, which can access a product database 140. In addition, a locator 115 can be provided to locate and/or communicate with RFID tags or marker products 155. An example locator can be a 2200 series, 2500 series, or 7000 series Dynatel Locator (available from 3M Company) and example marker products include 1420 series Dynatel ball markers (available from 3M Company). The information about the RFID products can be communicated to device 110 via Bluetooth, Wifi, NFC, or wired communication 134. The application will also provide for a web administration portal for asset logging data and contractor/installer login access.

Additionally, the application can provide for the logging and storage of an asset path or pathway. For example, locator 115 can locate a series of tags disposed on near an asset such as a pipe buried underground. A technician or installer can capture GPS coordinates (in some cases, in addition to other data) along the length of the pipe. These continuous coordinates can be communicated to the application and can be stored on the device 110 or loaded on the cloud 130. In another example, a technician or installer can log the tag for a cable accessory, such as a splice or termination, then walk along the path of the electrical leg or branch, back to, e.g., a junction or termination location. With each continuous GPS location stored, the continuous coordinates can be uploaded to the cloud through the application, thus providing a form of asset mapping for the user/asset owner.

This application can also provide a service contractor to access important information about a particular asset for inspection, repair and updating services. Upon being granted access by a utility owner, the service contractor can go to a location and pull up all necessary asset information based on the location and asset information provided previously by the installer. Thus, this level of detail can help expedite repair and maintenance work.

In various alternative embodiments, the application allows a user to save GPS location information using GIS. The application can provide options for using internal or interfacing with external GPS devices. The application can provide for barcode scanning and decoding by the device. The application can provide for OS support for both android and iOS-based devices. The application can provide for a link to online product documentation. The application can allow a device to be linked to a separate locator, which can communicate via Bluetooth or wired dongle. In addition, the application can provide for RFID programming. The application can provide customizable templates for product and user applications.

In addition, other features of the downloadable application include providing a custom instruction sheet for a particular product or kit that is linked to the tag/barcode captured. These instructions may be broken down into small parts with short videos and pictures that are accessible within the application. Capturing the tag/barcode will list the components possibly with a picture of all for a visual check—or it may prompt a checklist the installer can use to validate that all components are included. If a kit is being installed at a particular utility location, each component can be provided on the user interface, whereby the component can be selected for a description of its function and configuration. In addition, for cable accessories, capturing the tag and then entering the cable type (either the part number, a scan of the reel, or manual description) will check the compatibility of that kit with that cable (e.g., what are the proper lugs for that conductor, are the lugs the proper size, what is the proper grounding to be used, etc.). The application can help an installer make sure that all proper parts are provided or determine if additional parts are needed for a particular installation. In addition, an installer can take pictures that can be reviewed by a supervisor or the utility owner to verify proper installation for training. The installer can be prompted to take a picture at critical stages of installation and used to get feedback.

For example, an image of an asset can be captured by device 110 and can be stored on the device and/or uploaded through cloud services 130. Services can be provided to the asset owner or user to have the image analyzed by a subject matter expert or by an image analysis tool (which can be stored on the device) for immediate feedback as to the quality of the asset installation. The expert or virtual analysis tool can provide such feedback and indicate if additional installation efforts or additional parts are needed to complete the installation. When installing a cable accessory, such feedback can be related to cable cutbacks (e.g., for cable conductor, insulation, semiconductor layer lengths), crimp depth, crimp number, lug attachment, or other features.

In another aspect, the image of an asset captured by device 110 and stored on the device and/or uploaded through cloud services 130 can be used in a post installation evaluation process, for example to analyze such images over time or against later developing grid events.

Figure 2:
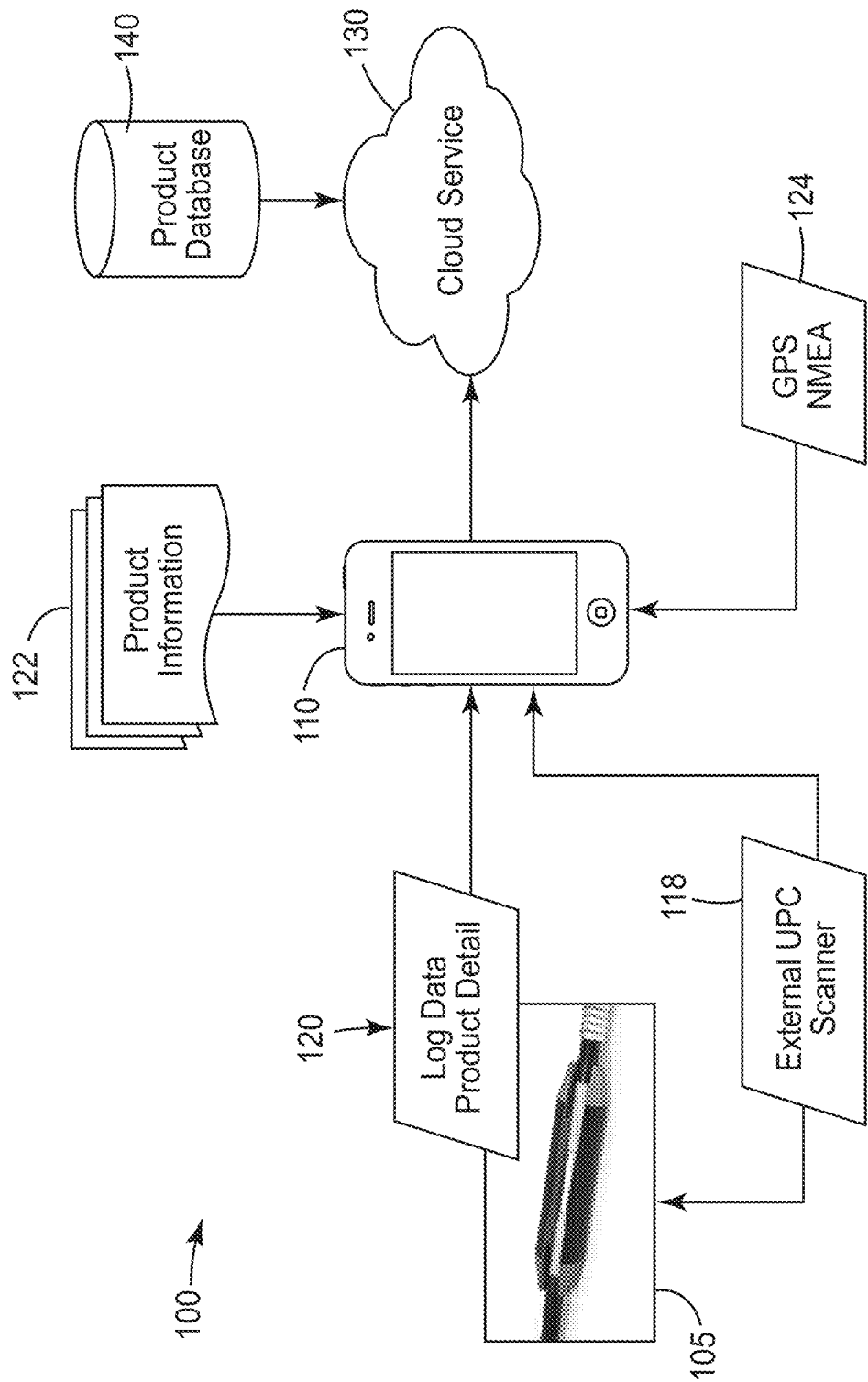
FIG. 2 is schematic view of another aspect of the asset management system according to another embodiment of the invention.

In another embodiment of the present invention, FIG. 2 shows a partial view of a system 100 when utilizing an external scanning device 118 to capture (scan) the tag (barcode, not shown) of the installed asset (e.g., cable accessory 105). In this aspect, mobile device 110 will receive the scanned code information and store asset information 120 (utility owner, installer information, etc.). This tag/barcode is linked to basic product information 122. In this embodiment, the GPS/NMEA location coordinates 124 are provided separately. Mobile device barcode compatible standards include: UPC-A, UPC-E, EAN-8, EAN-13, UCC-128, EAN-128, SSCC-18; Symbology: Interleaved 2-5 (numeric only), code 39, 128-A, UPC/EAN). The device 110 can link to, e.g., a web URL for retrieving product data sheet, information instructions and application videos from the cloud service 130 and/or product database 140.

Benefits of this type of system include automatic logging product information, linking to documents and videos for installation support and product info, detecting and instantly storing GPS information to capture asset location, and delivering a traceability method in accordance with ISO 1276-4 and IEEE 404, 48.

Figure 3:
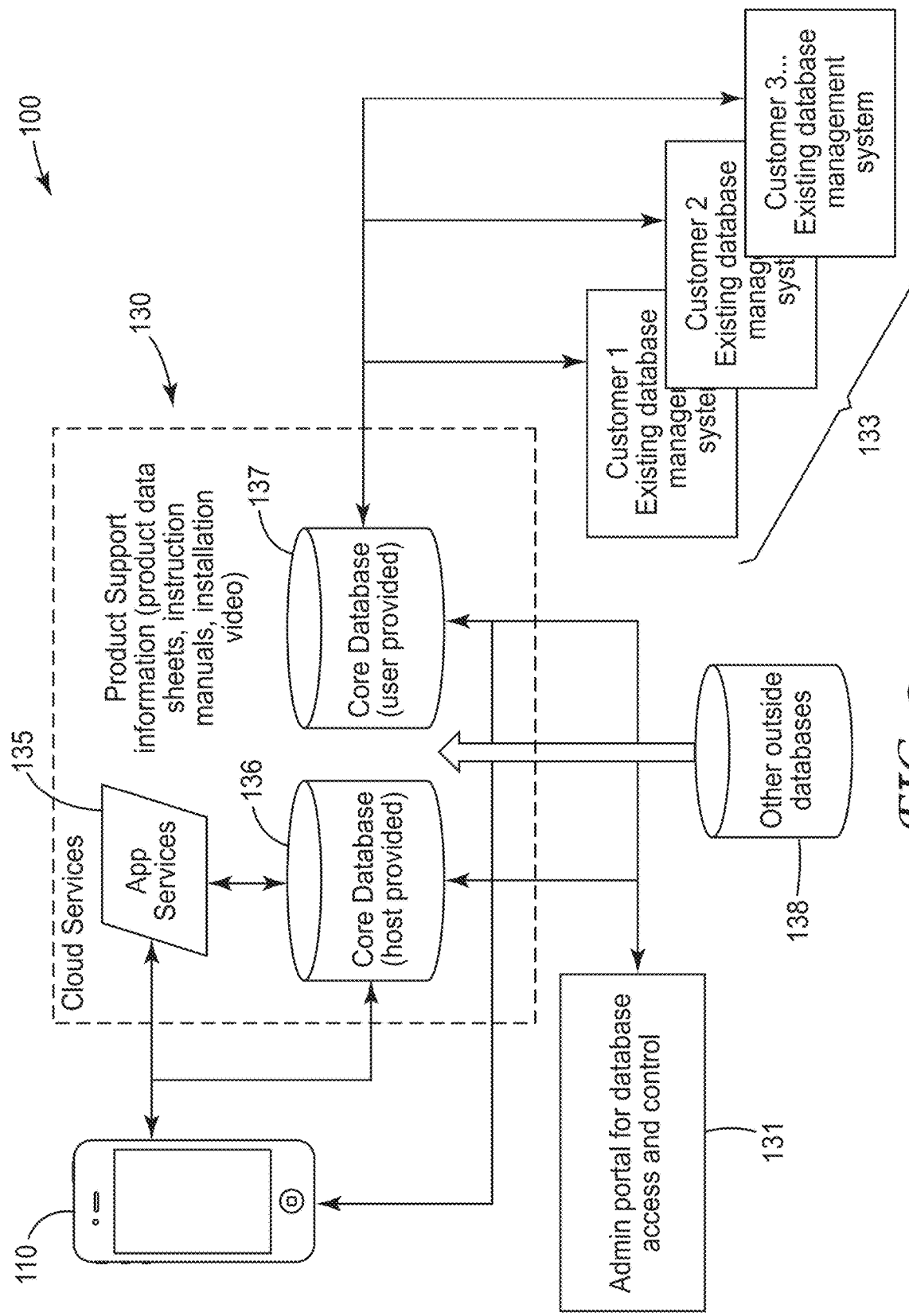
FIG. 3 is schematic view of another aspect of the asset management system according to another embodiment of the invention.

In another embodiment of the present invention, FIG. 3 shows further detail on the cloud services 130 of system 100. In further detail, information is collected and stored in the device 110 and is loaded into the cloud services database 130. The admin portal 131 allows for customers to assign projects to contractors, provide user access and view assets logged into the user (customer) provided database 137. The databases can also include host-owned databases 136 and outside databases 138. Multiple customers 133 can have their own management systems 133 stored in the cloud service 130. The app services 135 allow users to login credentials for accessing product, installer, contractor, distributor and utility company data.

For example, a utility company can assign multiple projects to contractors and all installations by the contractors. In one example, a contractor can be granted access from asset owner company admin for project logging. In another example, a first contractor A with projects from multiple utility companies will be able to access web portal and view all project installed with their credentials.

In the app, the user can select from predefined product templates, which can be open text or preloaded based on product information stored on the web. Templates can be configured for specific product uses. Templates can also be custom created to capture information valuable to the user. Templates can further be configured from many fields based on product, industry and customer needs. For example, use can access predefined templates, edit an existing template or create a new template through the app.

In another embodiment of the present invention, different access levels can be provided. For example, a first access level can be an asset owner admin access, with the highest level of access to collected log data. This user can grant access to contractor admin and contractor installers for collecting log data. The asset owner admin can retrieve or delete log data under the asset owner's company. This user can also revoke data that was captured by the contractor's admin. Another access level can be a Contractor admin access level, where the contractor company can view all collected data points by that contractor company. This user can grant use of the app or revoke use to installers in their company. Another access level can be an installer User access level, where the installer can only capture log data once they have been approved as a user by the asset owner admin or the contractor admin. This user can delete a record they captured. These examples are not meant to be an exhaustive list—many other access levels can be created for superusers, application service and updating, and within internal organizations.

In another embodiment of the present invention, referring back to FIG. 1, the system 100 can be implemented with RFID-based technologies, such as with locator & RFID-identified assets. For example, mobile device 110 can be connected to RFID locator 115, which is used to communicate with RFID marker devices (such as marker balls 155) for firmware download, data capture and programming provided by the product database 140. The benefits of this aspect of the invention include immediate access to download the most recent firmware. In addition, system 100 allows an asset owner to detect and instantly store GPS information to capture previously installed asset location. This system will also help deliver traceability in accordance with ISO 1276-4 and IEEE 404, 48. For example. RFID markers can use 1K X modem communication protocol. Mobile device communication can be Bluetooth FTP profile. The mobile device 110 can connect to the asset locating device 115 through wired or wireless connection 134.

Overall, the system and method described herein can provide owners with a timely and accurate asset management system and can allow flexibility and control over access to certain infrastructure assets. For example, a contractor can be given access to a facility to install/repair one or more assets during a particular installation/repair/maintenance project. the contractor can be provided with all of the product/installation information by a simple login to the app.

Various modifications, equivalent processes, as well as numerous structures to which the present invention may be applicable will be readily apparent to those of skill in the art to which the present invention is directed upon review of the present specification.

We claim:

1. A method for tracking and storing unique asset information with respect to at least one asset, comprising:
providing at least one asset having an associated tag;
capturing the tag and associated asset properties to a device, wherein the associated asset properties include the global position of the device at the time of capturing the tag with the device;
storing the tag and asset properties as asset information to a database that comprises a cloud services database, wherein the asset information is associated with the tag and global position of the device, wherein the cloud services database comprises an asset owner database;
providing different levels of access to the asset information, wherein an asset owner can grant access to a designated user for collecting log data related to the asset information; and
displaying asset information associated with at least the stored tag to the designated user.

2. The method of claim 1, wherein the asset information displayed is associated with at least the stored tag and global position of the device at the time of capturing the tag to the device.

3. The method of claim 1, wherein the asset properties further include the identity of the asset owner.

4. The method of claim 1, wherein the asset properties further include asset installation or maintenance information.

5. The method of claim 4, wherein the asset installation or maintenance information includes the identity of a contractor who installed or conducted maintenance on the asset.

6. The method of claim 1, wherein the asset information displayed includes basic product information.

7. The method of claim 1, wherein the asset information displayed includes product related videos.

8. The method of claim 1, further comprising:
capturing an image of the asset during or after installation; and
analyzing the captured image to provide feedback information related to the properties of the installed asset.

9. The method of claim 8, wherein the analysis determines asset installation quality.

10. The method of claim 1, further comprising:
capturing continuous coordinate information related to the asset at different locations to provide an asset path.

11. A system for tracking and storing unique asset information with respect to at least one asset, comprising:
a device having an installed application that prompts an installer to capture a tag associated with the at least one asset with the device, wherein the application can further capture associated asset properties to the device, wherein the associated asset properties include the global position of the device at the time of capturing the tag with the device; and
a cloud-based data storage platform for storing the tag and asset properties as asset information, wherein the asset information is associated with the tag and global position of the device, wherein the device is configured to display asset information associated with at least the stored tag, and wherein the application provides a first access level to permit access to a first entity to collected log data based on the information from the tag or associated asset properties, and wherein the first entity can grant additional access to the installer for collecting log data.

* * * * *